US012777434B2

(12) United States Patent
Cao et al.

(10) Patent No.: US 12,777,434 B2
(45) Date of Patent: Oct. 27, 2026

(54) MULTI-CELL SYNCHRONIZATION FOR DUAL CONNECTIVITY AND CARRIER AGGREGATION

(71) Applicant: QUALCOMM Incorporated, San Diego, CA (US)

(72) Inventors: Yiqing Cao, Beijing (CN); Yan Li, Beijing (CN); Ling Xie, Beijing (CN); Jie Mao, Beijing (CN); Kepei Tang, Beijing (CN); Bin Han, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/791,615

(22) PCT Filed: Jan. 9, 2021

(86) PCT No.: PCT/CN2021/070991
§ 371 (c)(1),
(2) Date: Jul. 8, 2022

(87) PCT Pub. No.: WO2021/139801
PCT Pub. Date: Jul. 15, 2021

(65) Prior Publication Data

US 2023/0044975 A1 Feb. 9, 2023

(30) Foreign Application Priority Data

Jan. 10, 2020 (WO) ................ PCT/CN2020/071309

(51) Int. Cl.
*H04W 56/00* (2009.01)
*H04L 5/14* (2006.01)

(52) U.S. Cl.
CPC ............ *H04W 56/001* (2013.01); *H04L 5/14* (2013.01)

(58) Field of Classification Search
CPC ... H04W 56/001; H04W 24/02; H04W 88/06; H04L 5/14
See application file for complete search history.

(56) References Cited

U.S. PATENT DOCUMENTS 8,451,757 B2 * 5/2013 Lee .................. H04W 36/0088 370/310
9,485,683 B2 * 11/2016 Chincholi ............ H04W 24/10
(Continued)

FOREIGN PATENT DOCUMENTS

CN 101998543 A 3/2011
CN 103875285 A 6/2014
(Continued)

OTHER PUBLICATIONS

International Search Report and Written Opinion—PCT/CN2021/070991—ISA/EPO—Mar. 26, 2021.
(Continued)

*Primary Examiner* — Rasheed Gidado
(74) *Attorney, Agent, or Firm* — Patterson & Sheridan LLP

(57) ABSTRACT

Techniques and apparatus for achieving multi-cell synchronization for dual connectivity and carrier aggregation are described. In one technique, a timing difference between a first base station (BS) and a second BS is determined, where the first BS is in an asynchronous timing configuration with respect to the second BS. A measurement configuration for measuring signal(s) from the second BS is determined, based on the timing difference. The measurement configuration is signaled to a user equipment (UE) served by the first BS. The UE performs a measurement procedure for the signal(s) in accordance with the measurement configuration. In another technique, the second BS receives a synchronization request, which includes a first time stamp, from the first BS via a network interface between the first BS and the
(Continued)

second BS. The second BS sends a synchronization response, which includes a second time stamp, to the first BS.

25 Claims, 14 Drawing Sheets

(56) References Cited

U.S. PATENT DOCUMENTS

| | | | | |
|---|---|---|---|---|
| 2006/0083265 | A1* | 4/2006 | Jordan | H04J 3/0682 370/410 |
| 2009/0207814 | A1* | 8/2009 | Ishii | H04W 48/12 370/335 |
| 2010/0113054 | A1* | 5/2010 | Iwamura | H04L 1/0027 455/452.1 |
| 2011/0256833 | A1 | 10/2011 | Racz et al. | |
| 2012/0014357 | A1 | 1/2012 | Jung et al. | |
| 2012/0314587 | A1* | 12/2012 | Curticapean | G01S 5/0284 370/252 |
| 2013/0223409 | A1 | 8/2013 | Jung et al. | |
| 2013/0288672 | A1* | 10/2013 | He | H04W 36/0058 455/434 |
| 2015/0189574 | A1 | 7/2015 | Ng et al. | |
| 2016/0100374 | A1 | 4/2016 | Choi et al. | |
| 2017/0006566 | A1* | 1/2017 | Zhang | H04L 5/001 |
| 2017/0134976 | A1* | 5/2017 | Uchino | H04W 36/0088 |
| 2017/0295568 | A1* | 10/2017 | Takeda | H04W 52/30 |
| 2018/0062707 | A1 | 3/2018 | Chen et al. | |
| 2018/0220318 | A1 | 8/2018 | Uemura et al. | |
| 2019/0110254 | A1* | 4/2019 | Yerramalli | H04L 5/0051 |
| 2020/0296612 | A1 | 9/2020 | Ma et al. | |
| 2020/0358547 | A1* | 11/2020 | Liu | H04W 48/16 |
| 2020/0389929 | A1* | 12/2020 | Harada | H04W 24/10 |
| 2020/0413358 | A1* | 12/2020 | Harada | H04W 56/001 |
| 2021/0160942 | A1* | 5/2021 | Venkatachari | H04W 76/34 |

FOREIGN PATENT DOCUMENTS

| | | | |
|---|---|---|---|
| CN | 104936223 | A | 9/2015 |
| CN | 105981457 | A | 9/2016 |
| CN | 107787004 | A | 3/2018 |
| CN | 107820263 | A | 3/2018 |
| CN | 109075940 | A | 12/2018 |
| CN | 109474951 | A | 3/2019 |
| WO | 2013055338 | A1 | 4/2013 |
| WO | 2019090559 | A1 | 5/2019 |
| WO | 2019091265 | A1 | 5/2019 |
| WO | 2019160266 | A1 | 8/2019 |
| WO | 2019210504 | A1 | 11/2019 |

OTHER PUBLICATIONS

International Search Report and Written Opinion—PCT/CN2020/071309—ISA/EPO—Oct. 12, 2020.

Supplementary European Search Report—EP21738558—Search Authority—The Hague—Jan. 23, 2024.

* cited by examiner

Synchronous Network

MULTI-CELL SYNCHRONIZATION FOR DUAL CONNECTIVITY AND CARRIER AGGREGATION

CROSS-REFERENCE TO RELATED APPLICATIONS

This application is a national stage application under 35 U.S.C. 371 of PCT/CN2021/070991, filed Jan. 9, 2021, which claims benefit of and priority to PCT/CN2020/071309, filed Jan. 10, 2020, which are hereby expressly incorporated by reference herein in their entirety as if fully set forth below and for all applicable purposes.

BACKGROUND

I. Field of the Disclosure

Aspects of the present disclosure relate to wireless communications, and more particularly, to techniques for performing multi-cell synchronization for dual connectivity (DC) scenarios and/or carrier aggregation (CA) scenarios.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved measurements of neighboring cells.

Certain aspects provide a method for wireless communication that may be performed by a first base station (BS). The method generally includes determining a timing difference between the first BS and one or more second BSs. The first BS is in an asynchronous timing configuration with respect to the one or more second BSs. The method also includes determining a measurement configuration for measuring one or more signals from the one or more second BSs, based at least in part on the timing difference between the first BS and the one or more second BSs. The method further includes signaling the measurement configuration to a user equipment (UE) served by the first BS.

Certain aspects provide an apparatus for wireless communication. The apparatus generally includes at least one processor, a memory coupled to the at least one processor, and a transmitter. The at least one processor is configured to determine a timing difference between the apparatus and one or more BSs. The apparatus is in an asynchronous timing configuration with respect to the one or more BSs. The at least one processor is also configured to determine a measurement configuration for measuring one or more signals from the one or more BSs, based at least in part on the timing difference between the apparatus and the one or more BSs. The transmitter is configured to transmit the measurement configuration to a user equipment (UE) served by the apparatus.

Certain aspects provide an apparatus for wireless communication. The apparatus generally includes means for determining a timing difference between the apparatus and one or more BSs. The apparatus is in an asynchronous timing configuration with respect to the one or more BSs. The apparatus also includes means for determining a measurement configuration for measuring one or more signals from the one or more BSs, based at least in part on the timing difference between the apparatus and the one or more BSs. The apparatus further includes means for signaling the measurement configuration to a user equipment (UE) served by the apparatus.

Certain aspects provide a computer readable medium having computer executable code stored thereon for wireless communications by a first BS. The computer executable code generally includes code for determining a timing difference between the first BS and one or more second BSs. The first BS is in an asynchronous timing configuration with respect to the one or more second BSs. The computer executable code also includes code for determining a measurement configuration for measuring one or more signals from the one or more second BSs, based at least in part on the timing difference between the first BS and the one or more second BSs. The computer executable code further includes code for signaling the measurement configuration to a user equipment (UE) served by the first BS.

Certain aspects provide a method for wireless communication that may be performed by a first BS. The method generally includes receiving a synchronization request comprising a first time stamp from a second BS via a network interface between the first BS and the second BS. The first BS is in an asynchronous timing configuration with respect to the second BS. The method also includes sending a synchronization response comprising at least a second time stamp to the second BS.

Certain aspects provide an apparatus for wireless communication. The apparatus generally includes at least one processor, a memory coupled to the at least one processor, a receiver, and a transmitter. The receiver is configured to receive a synchronization request comprising a first time stamp from a BS via a network interface between the apparatus and the BS. The apparatus is in an asynchronous timing configuration with respect to the BS. The transmitter is configured to transmit a synchronization response comprising at least a second time stamp to the BS.

Certain aspects provide an apparatus for wireless communication. The apparatus generally includes means for receiving a synchronization request comprising a first time stamp from a BS via a network interface between the apparatus and the BS. The apparatus is in an asynchronous timing configuration with respect to the BS. The apparatus also includes means for sending a synchronization response comprising at least a second time stamp to the BS.

Certain aspects provide a computer readable medium having computer executable code stored thereon for wireless communications by a first BS. The computer executable code generally includes code for receiving a synchronization request comprising a first time stamp from a second BS via a network interface between the first BS and the second BS. The first BS is in an asynchronous timing configuration with respect to the second BS. The computer executable code also includes code for sending a synchronization response comprising at least a second time stamp to the second BS.

Certain aspects provide a method for wireless communication that may be performed by a UE. The method generally includes receiving, from a first BS serving the UE, a measurement configuration for measuring one or more signals from one or more second BSs. The first BS is in an asynchronous timing configuration with respect to the one or more second BSs. The measurement configuration is based on a timing difference between the first BS and the one or more second BSs. The method also includes performing a measurement procedure for the one or more signals, in accordance with the measurement configuration.

Certain aspects provide an apparatus for wireless communication. The apparatus generally includes at least one processor, a memory coupled to the at least one processor, and a receiver. The receiver is configured to receive, from a first BS serving the UE, a measurement configuration for measuring one or more signals from one or more second BSs. The first BS is in an asynchronous timing configuration with respect to the one or more second BSs. The measurement configuration is based on a timing difference between the first BS and the one or more second BSs. The at least one processor is configured to perform a measurement procedure for the one or more signals, in accordance with the measurement configuration.

Certain aspects provide an apparatus for wireless communication. The apparatus generally includes means for receiving, from a first BS serving the UE, a measurement configuration for measuring one or more signals from one or more second BSs. The first BS is in an asynchronous timing configuration with respect to the one or more second BSs. The measurement configuration is based on a timing difference between the first BS and the one or more second BSs. The apparatus also includes means for performing a measurement procedure for the one or more signals, in accordance with the measurement configuration.

Certain aspects provide a computer readable medium having computer executable code stored thereon for wireless communications by a UE. The computer executable code generally includes code for receiving, from a first BS serving the UE, a measurement configuration for measuring one or more signals from one or more second BSs. The first BS is in an asynchronous timing configuration with respect to the one or more second BSs. The measurement configuration is based on a timing difference between the first BS and the one or more second BSs. The computer executable code also includes code for performing a measurement procedure for the one or more signals, in accordance with the measurement configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
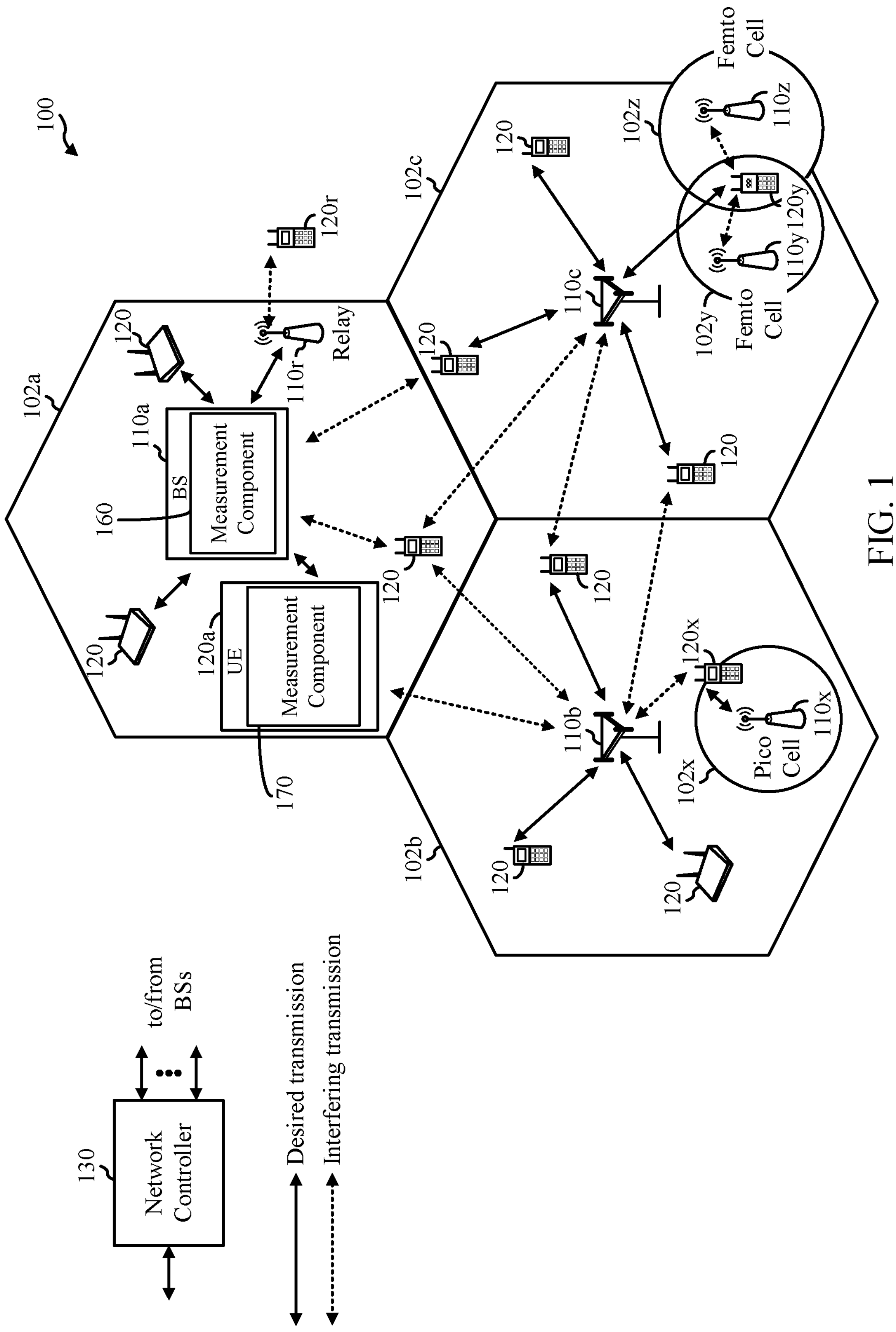
FIG. 1 is a block diagram conceptually illustrating an example telecommunications system, in accordance with certain aspects of the present disclosure.

Aspects of the present disclosure provide apparatus, methods, processing systems, and computer readable mediums for achieving a multi-cell synchronization for cells in a dual connectivity (DC) and/or carrier aggregation (CA) configuration in order to facilitate measurement of signals from neighboring cells by UEs.

Some communication systems may support the deployment of multiple wireless networks within a geographical region. Each wireless network may support a particular radio access technology (RAT) (e.g., LTE, NR, etc.), support a particular duplexing mode (time division duplexing (TDD), frequency division duplexing (FDD)), operate on one or more frequencies, support a particular numerology (e.g., subcarrier spacing, etc.), and so on. In some cases, one or more of the wireless networks may be in a DC configuration and/or CA configuration. For example, in a DC scenario, a UE may be connected to, and receive service from, two different radio access network (RAN) nodes (also referred to herein generally as BSs) (e.g., eNodeB(s), gNB(s), enhanced eNodeB(s), or combinations thereof, etc.). In a CA scenario, one or more component carriers may be combined into a single channel to increase the capacity of the network.

In some cases, when operating in a communication system that supports DC and/or CA, a UE may switch from exchanging traffic via a first wireless network (e.g., first RAT) to exchanging traffic via a second wireless network (e.g., second RAT). For example, for dual connectivity between E-UTRAN (also known as LTE) and 5G NR, if a large amount of data (e.g., above a threshold) is transmitted, the LTE eNB (anchor or serving BS) may trigger the UE to open a NR link with a NR gNB (neighbor BS) and direct the traffic (from the UE) to the NR link. The process to enable the NR link may involve the UE acquiring the timing of the NR gNB, e.g., by detecting the synchronization signal block (SSB) transmitted by the NR gNB. Dual connectivity between E-UTRAN and 5G NR may be referred to as EN-DC.

To facilitate the UE's measurement of SSB in the EN-DC scenario, the LTE eNB may configure (or set) the measurement gap based on the assumption that the LTE eNB and the NR gNB (to be measured) are fully synchronized (e.g., a synchronized timing configuration exists between the LTE eNB and NR gNB). In some situations, however, the LTE eNB and the NR gNB may not be fully synchronized. As a reference example, a FDD LTE eNB may not be synchronized with other FDD LTE eNBs. As another reference example, a FDD NR gNB may not be synchronized with other FDD NR gNBs. As another reference example, a TDD LTE eNB may not be synchronized with a TDD NR gNB.

Due in part to the asynchronous timing configuration between RAN nodes of different RATs, a UE may not detect neighbor BSs (e.g., NR gNB) within the measurement gap configured by the serving (or anchor) BS (e.g., LTE eNB). This, in turn, can increase the interruption time and power consumption of the UE, significantly impacting network performance.

To address this, aspects provide techniques that can facilitate measurement of synchronization signals (SS) (e.g., SSB, etc.) transmitted by neighbor BSs. In one particular aspect, an anchor BS may determine a timing difference between the anchor BS and a neighbor BS. The anchor BS may determine a measurement configuration for a UE (served by the anchor BS) to use for measuring signal(s) from the neighbor BS, based at least in part on the timing difference. The anchor BS may signal the measurement configuration to the UE. Doing so can reduce the measurement timing window for the neighbor cell, which enables the UE to save power. In addition, reducing the measurement timing window enables the UE to save power by increasing the throughput of the serving cell due to a shorter interruption time.

The following description provides examples of facilitating neighbor cell measurement in DC and/or CA scenarios in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

As shown, the BS 110*a* includes a measurement component 160, which is configured to implement one or more techniques described herein. Using the measurement component 160, the BS 110*a* may determine a timing difference between the BS 110*a* and at least another BS (e.g., BS 110*b*). For example, the BS 110*a* may be in an asynchronous timing configuration with respect to the other BS. The BS 110*a* may determine, via the measurement component 160, a measurement configuration for measuring one or more signals from the other BS, based at least in part on the timing difference between the BS 110*a* and the other BS. The BS 110*a* may signal the measurement configuration to a UE (e.g., UE 120*a*) served by the BS 110*a*.

In some aspects, assuming BS 110*a* is a neighboring BS, the BS 110*a* may use the measurement component 160 to receive a synchronization request that includes a first time stamp from another BS (e.g., BS 110*b*) via a network interface between the BS 110*a* and the other BS. The BS 110*a* may be in an asynchronous timing configuration with respect to the other BS. The BS 110*a* may send, via the measurement component 160, a synchronization response comprising at least a second time stamp to the other BS.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
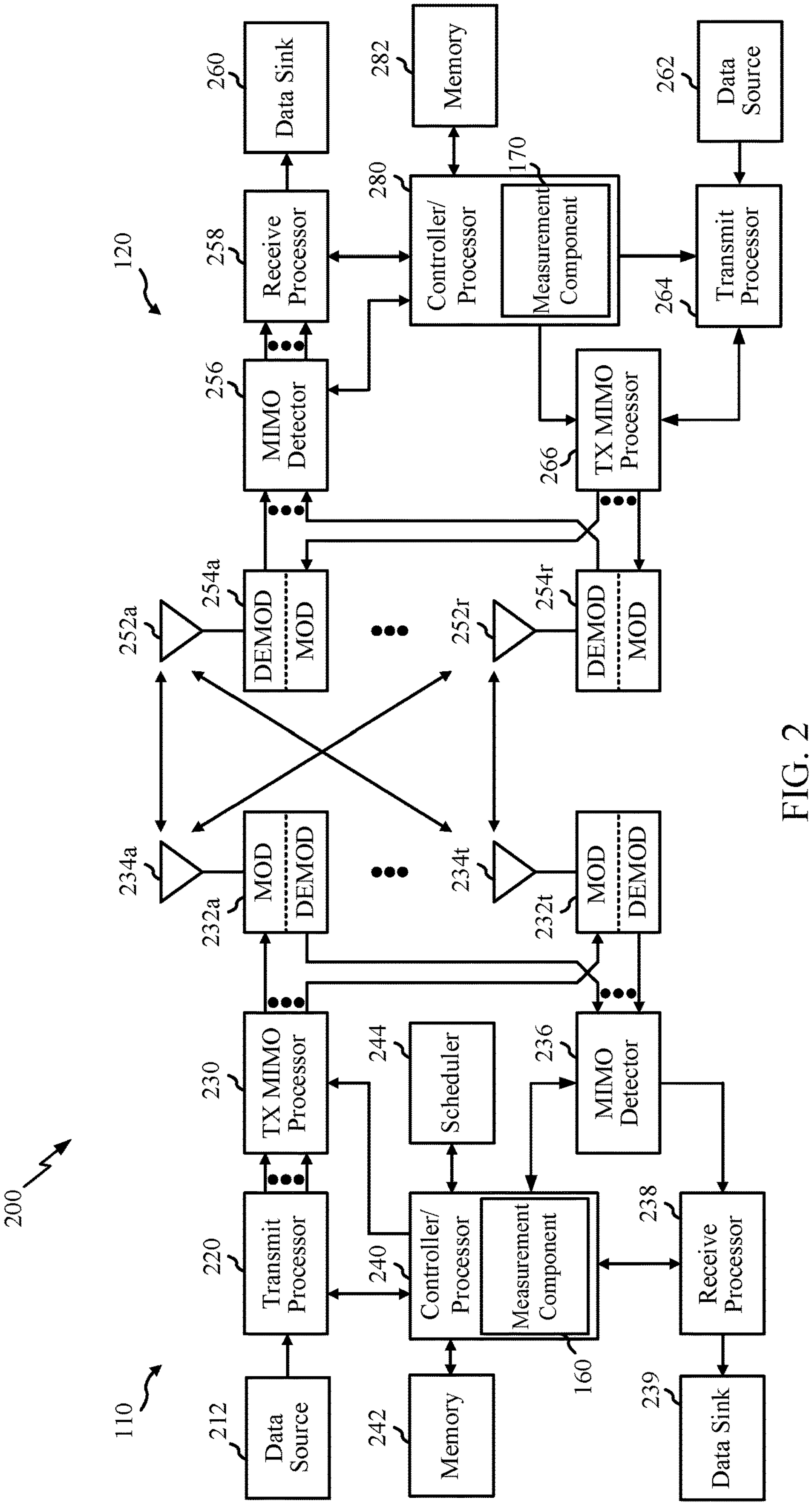
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink. The controller/processor 240 and/or other processors and modules at the BS 110*a* may perform or direct the execution of processes for the techniques described herein. For example, as shown in FIG. 2, the controller/processor 240 of the BS 110*a* includes a measurement component 160 that may be configured to perform operations 900 illustrated in FIG. 9, operations 1000 illustrated in FIG. 10 and/or one or more other techniques described herein. Similarly, the controller/processor 280 and/or other processors and modules at the UE 120*a* may perform or direct the execution of processes for the techniques described herein. For example, as shown in FIG. 2, the controller/processor 280 of the UE 120*a* includes a measurement component 170 that may be configured to perform operations 1100 illustrated in FIG. 11 and/or one or more other techniques described herein. Although shown at the controller/processor, other components of the UE 120*a* and BS 110*a* may be used performing the operations described herein.

Figure 3:
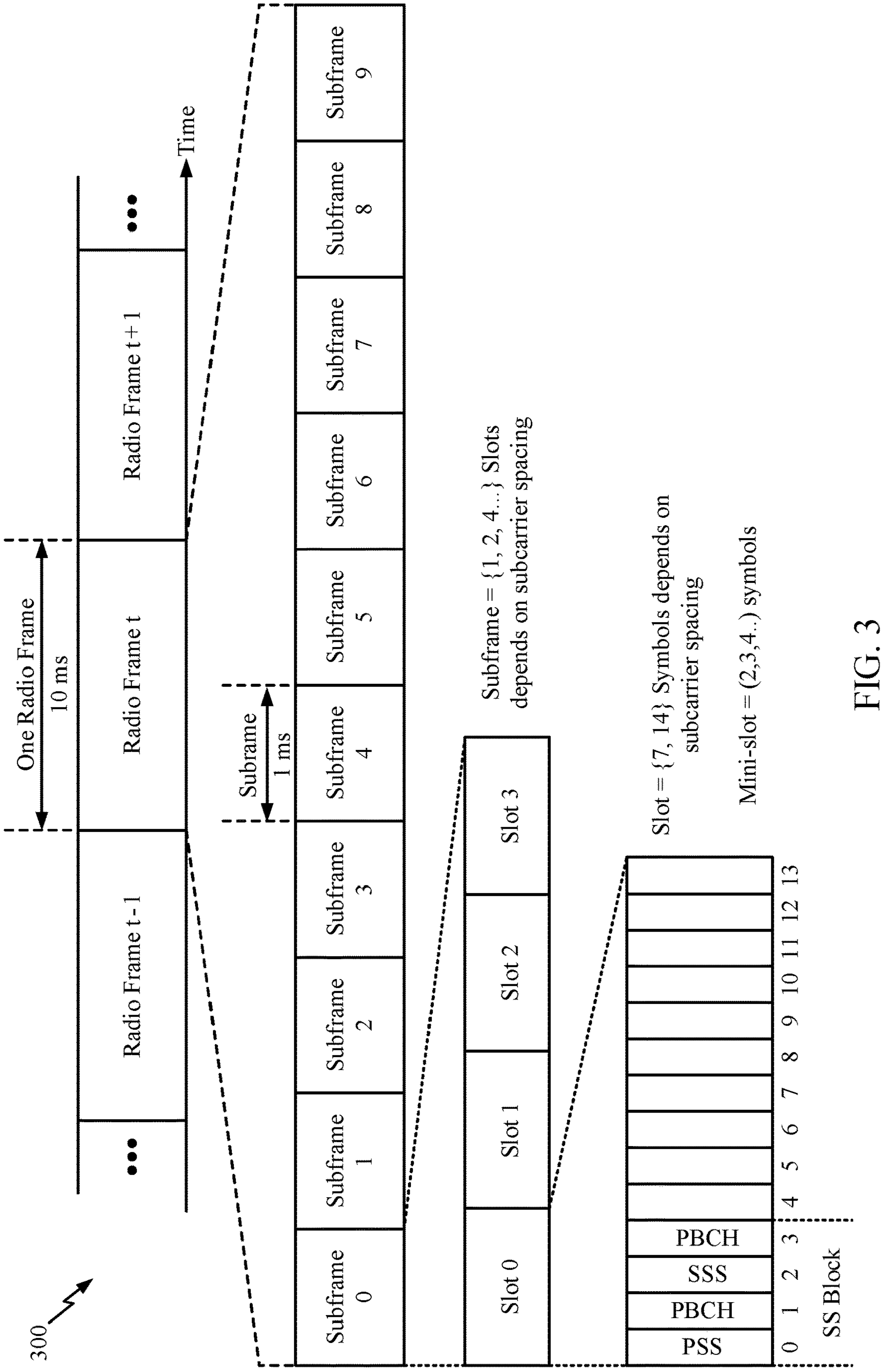
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

Figure 4:
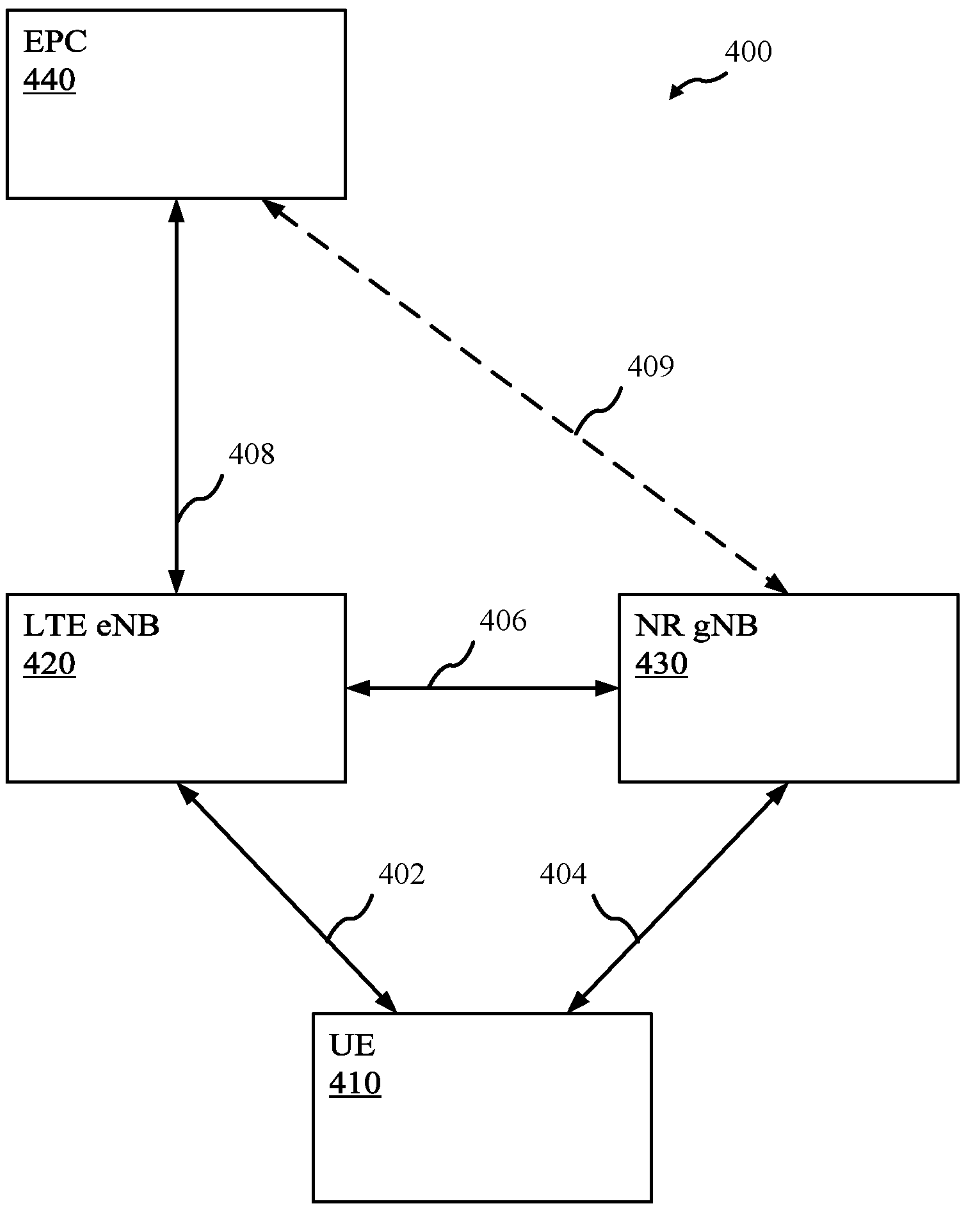
FIG. 4 is an example system architecture for dual connectivity between two radio access technologies (RATs), in accordance with certain aspects of the present disclosure.

FIG. 4 is a block diagram illustrating an example system architecture 400 for dual connectivity (DC) between E-UTRAN and 5G NR (EN-DC), in accordance with certain aspects of the present disclosure. As previously stated, with deployment of 5G, a UE 410 (e.g., UE 120*a* of FIG. 1) may have dual connectivity functionality allowing the UE 410 to simultaneously communicate with a first BS 420 (e.g., BS 110*a* of FIG. 1) utilizing an LTE RAT (e.g., a communication with an evolved NodeB (eNB)) and a second BS 430 (e.g., BS 110*b* of FIG. 1) utilizing a 5G NR RAT (e.g., a communication with a next generation BS (gNB)). While the example system architecture shows the first BS 420 and second BS 430 as separate base stations, the present disclosure is not so limited, and the first BS 420 and second BS 430 may be separate physical entities (e.g., transceivers) or separate logical entities (e.g., different software modules executing on one processing system with one transceiver) within a single base station (e.g., BS 110*a* of FIG. 1).

The UE 410 is configured to engage in a dual connectivity communication with the first BS 420 via interface 402 (e.g., a wireless interface, such as a Uu interface) and the second BS 430 via interface 404 (e.g., a wireless interface, such as a Uu interface). Here, the first BS 420 and the second BS 430 may be connected to one another via interface 406 (e.g., an X2 interface or, in general, an Xn interface), as shown. The first BS 420 may connect to an evolved packet core (EPC) 440 via interface 408 (e.g., an S1 interface), where interface 408 connects to a mobile management entity (MME) (control plane) and to a system architecture evolution (SAE) gateway (S-GW) (user plane). In some aspects of the present disclosure, the second BS 430 may optionally connect to the EPC 440 on the user plane via interface 409 (e.g., an S1-U interface).

In certain systems, such as Release 15 of the 3GPP wireless standards for NR (new radio or 5G access technologies), radio resource management (RRM) measurements are performed. RRM measurements may include, for example, channel quality indicator (CQI), reference signal received power (RSRP), reference signal received quality (RSRQ), and/or received signal strength indicator (RSSI) measurements. RRM measurements may be used, for example, for mobility decisions, link adaptation, scheduling, and/or other uses.

In some examples, the common reference signal (CRS) is used for RRM measurements. In NR, the synchronization signal (NR-SS), such as the SSB, and/or the channel state information reference signal (CSI-RS) can be used for performing RRM measurements. CSI-RS based RRM may provide improved beam resolution. In some examples, only one type of RS is configured for one periodic and/or event-triggered measurement report.

For asynchronous network deployments, the SSB may be used for RRM measurements (e.g., referred to as SSB-based RRM measurement). SSB may be an "always on" reference signal. The SSB may include a 1-symbol PSS, 1-symbol SSS, and 2 symbols PBCH that are time division multiplexed (TDM'd) in consecutive symbols. In some examples, the transmission of SSBs within an SS burst may be confined to a window.

A cell may be associated with a SSB measurement timing configuration (SMTC) based on its configuration for SSB transmission. The SMTC may define an SMTC window duration (e.g., {1, 2, 3, 4, 5} ms); an SMTC window timing offset (e.g., {0, 1, SMTC periodicity-1} ms); and an SMTC periodicity (e.g., {5, 10, 20, 40, 80, 160} ms). The SMTC may be configured by the network for SSB-based RRM measurements. For example, the SMTC may be configured with a measurement object.

Figure 5:
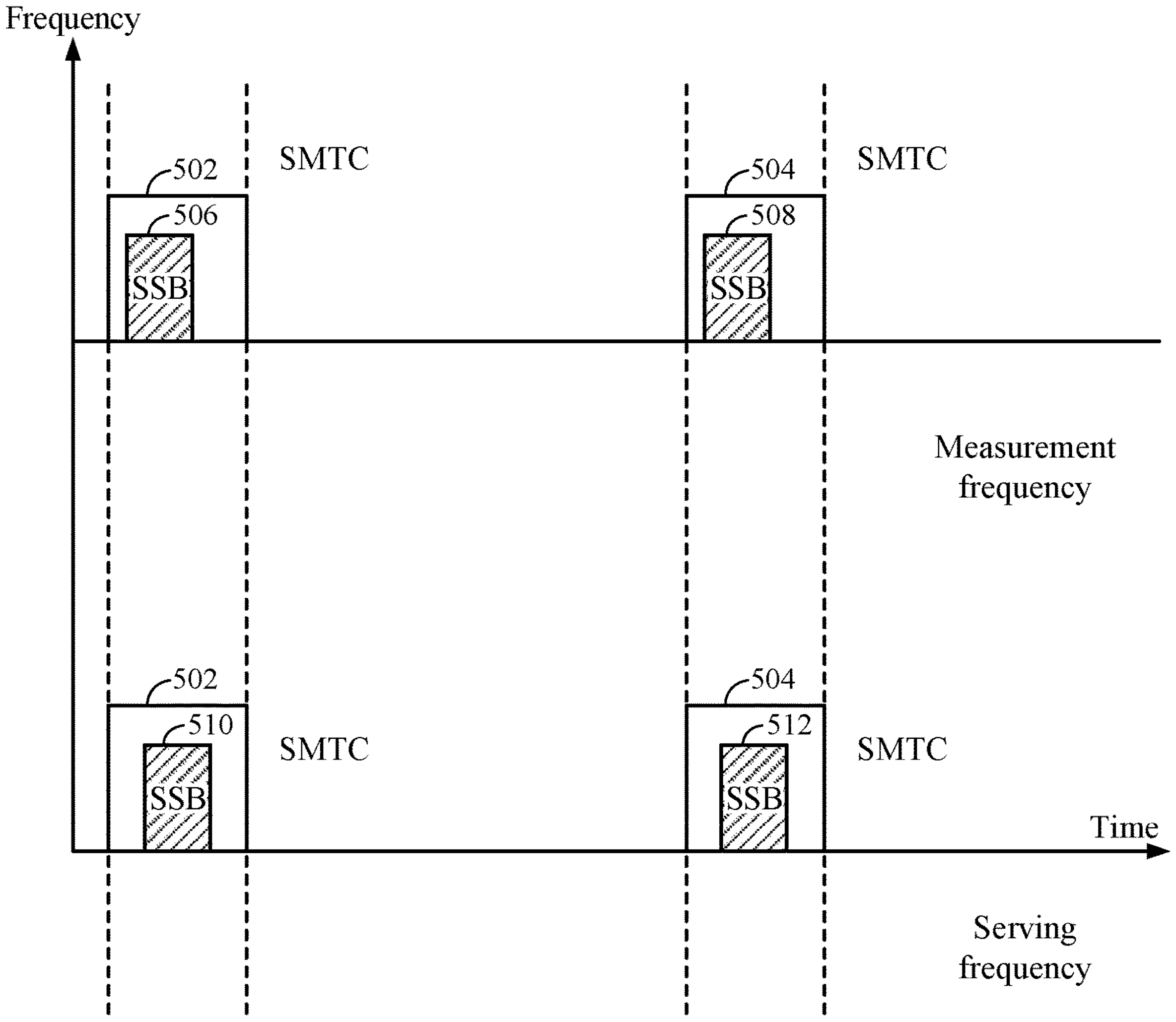
FIG. 5 is an example of synchronization signal block (SSB) transmission in a synchronous network, in accordance with certain aspects of the present disclosure.
Figure 6:
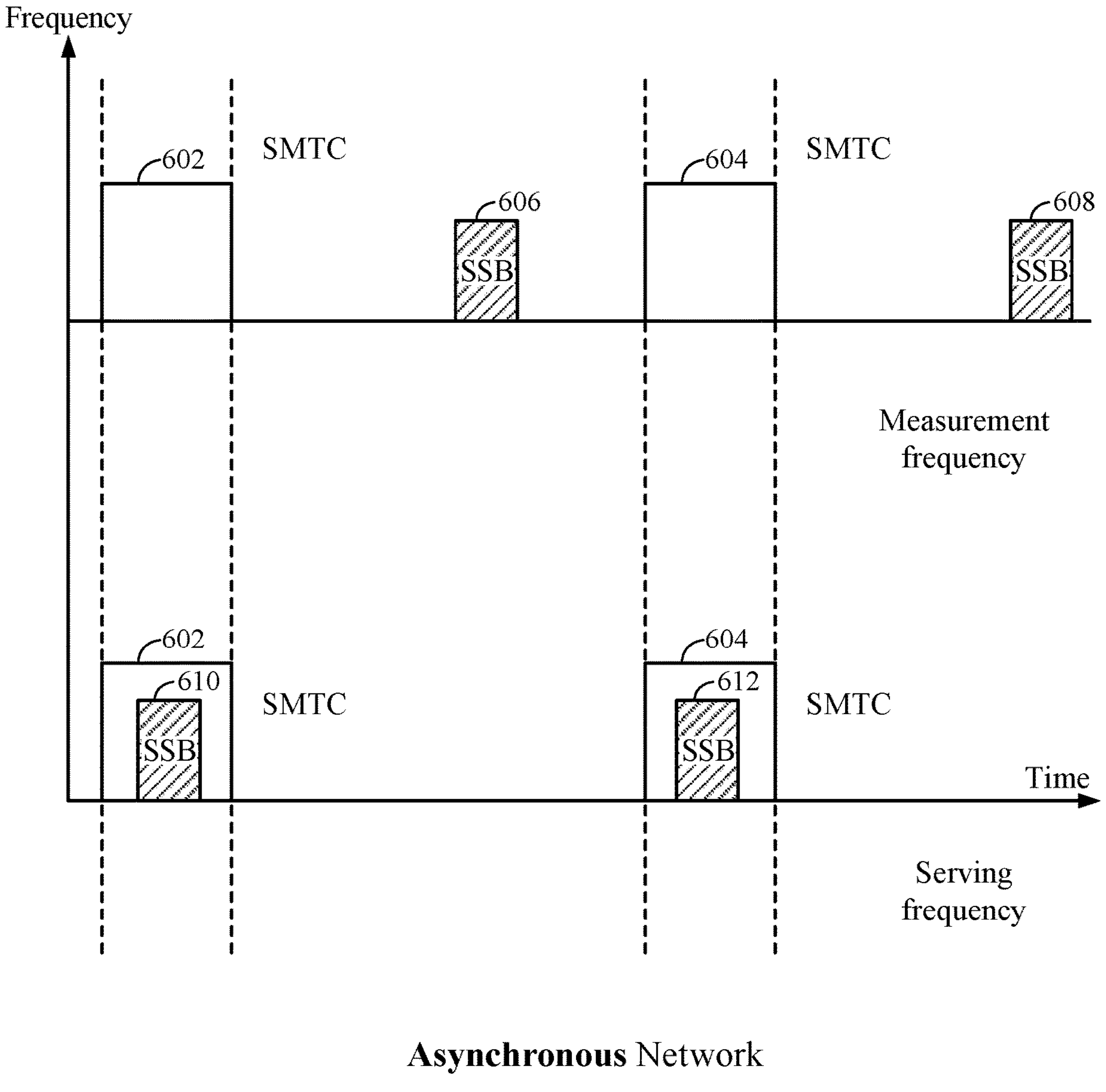
FIG. 6 is an example of SSB transmission in an asynchronous network, in accordance with certain aspects of the present disclosure.

In some systems, such as Release-15 NR, the network is synchronous. In a synchronous network, the timing offset between cells is small. Thus, as shown in FIG. 5, in a synchronous network the target cell SSB 506, 508 falls within the same SMTC window 502, 504 as the serving cell SSBs 510, 512. In some systems; however, such as Release-16 NR, the network may be asynchronous. In this case, the target cell(s) to measure in the target frequency may be asynchronous with the UE's serving cell. Thus, the SSBs of the serving cell and target may not be aligned. As shown in FIG. 6, in an asynchronous network, the SSBs (610, 612) from the serving cell and the SSBs 606, 608 from the target cells have a time offset (that may be large) and the SSBs 606, 608 for the target cell may be outside the SMTC window 602, 604. In this case, the UE may have to blindly detect the target cell(s) SSB, which can increase the interruption time for the UE and/or increase the power consumption of the UE.

As noted above, in cases where multiple cells are in a DC configuration and/or CA configuration, an asynchronous network deployment can cause an interruption in data exchange for the UE for a significant amount of time and/or significantly increase the power consumption of the UE. For example, consider the EN-DC deployment depicted in FIG. 4 as a reference example of a DC scenario. In this scenario, if there is a large amount of data to be transmitted (e.g., from the UE 410), the first BS 420 (which is serving the UE 410) may trigger the UE 410 to open a NR link via the second BS 430 (which is a neighboring BS) and direct the traffic via the NR link. The process to enable the NR link may involve the UE 410 acquiring the timing of the second BS 430, e.g., by detecting the SSB transmitted by the second BS 430.

To facilitate the UE's measurement of SSB, the first BS 420 may configure (or set) the measurement gap based on the assumption that the first BS 420 and the second BS 430 (to be measured) are fully synchronized (e.g., a synchronized timing configuration). In some situations, however, the first BS 420 and the second BS 430 may not be fully synchronized. As a reference example, a FDD LTE BS (e.g., first BS) may not be synchronized with other FDD LTE BSs (e.g., second BSs). As another reference example, a FDD NR BS (e.g., first BS) may not be synchronized with other FDD NR BSs (e.g., second BSs). As another reference example, a TDD LTE BS (e.g., first BS) may not be synchronized with a TDD NR BS (e.g., second BS).

Figure 7:
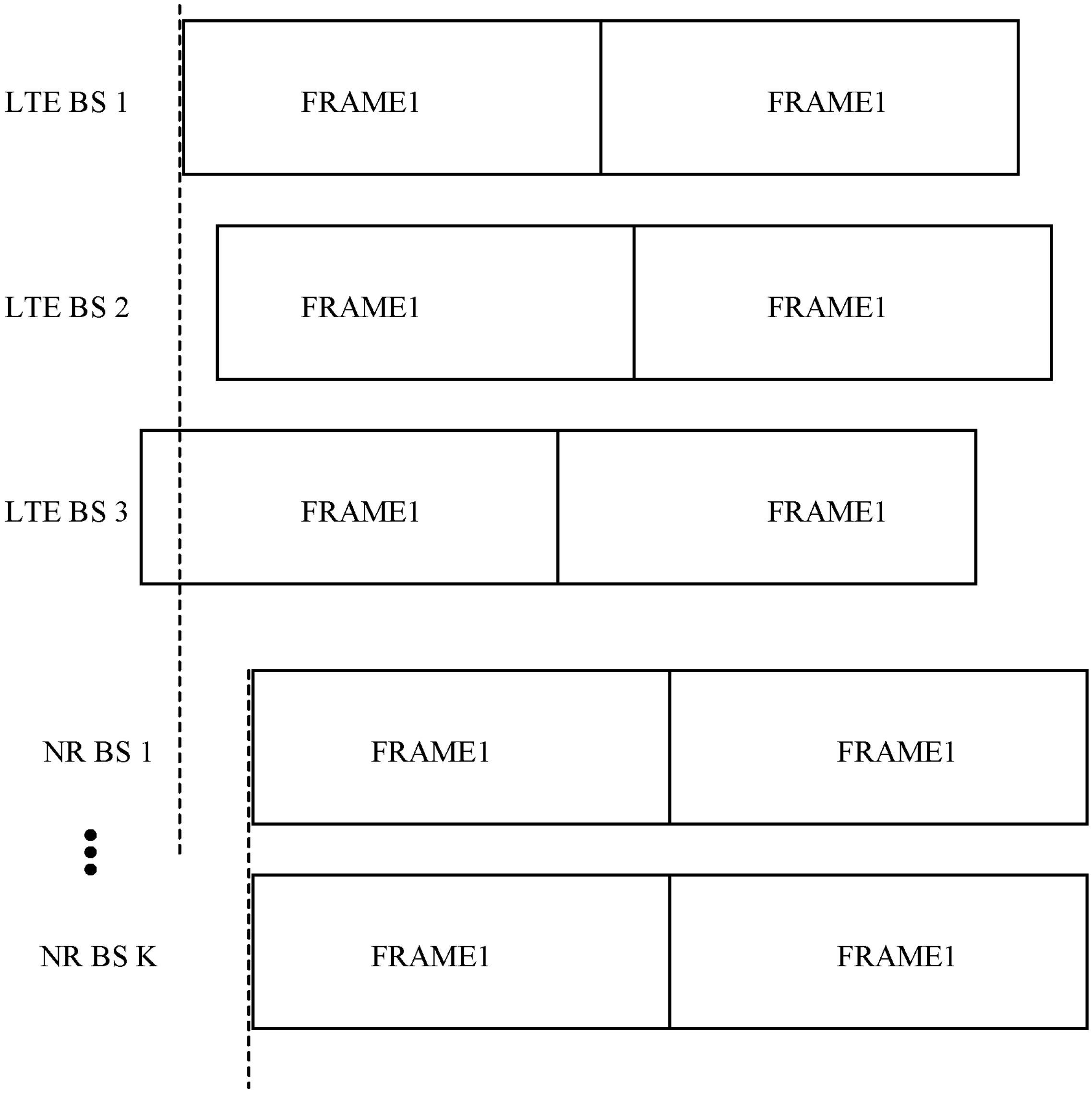
FIG. 7 illustrates an example of a dual connectivity deployment with asynchronous networks, in accordance with certain aspects of the present disclosure.

In the EN-DC scenario depicted in FIG. 7, for example, each of the FDD LTE BSs 1-3 are asynchronous with respect to each other and with respect to each of the TDD NR BSs 1-K. On the other hand, the TDD NR BSs 1-K are in a synchronous deployment (e.g., each of the TDD NR BSs 1-K are synchronized with respect to each other). Due in part to the asynchronous timing configuration between RAN nodes of different RATs, a UE may not detect neighbor BSs (e.g., NR gNBs) within the measurement gap configured by the serving BS (e.g., LTE eNB). This, in turn, can increase the interruption time and power consumption of the UE, significantly impacting network performance.

Accordingly, it may be desirable to provide techniques that enable UEs to account for asynchronous network deployments when performing measurement procedures in DC and/or CA scenarios.

Example Multi-Cell Synchronization for DC and CA

Aspects presented herein provide techniques that can facilitate measurement of synchronization signals (e.g., SS, SSB, etc.) transmitted by neighbor BSs (e.g., gNB(s), eNB(s), eLTE eNB(s), etc.). The techniques described herein may be applicable to various multi-cell deployment scenarios.

In one example scenario (referred to herein as Scenario 1) (e.g., EN-DC), a FDD LTE BS (anchor) (e.g., BS 110*a*) may be in a DC with a TDD NR BS (e.g., BS 110*b*). One issue with Scenario 1 is that the FDD LTE BS(s) may not be synchronized with other FDD LTE BS(s) and/or with the TDD NR BS(s). Consequently, without knowing the timing difference between the LTE anchor and the NR BS(s), the LTE anchor may configure a measurement gap that is insufficient for the UE to measure the SSB from the interested NR BS(s). For example, the LTE SS periodicity may be 5 ms, and the NR SSB periodicity may be up to 20 ms. In general, operators typically set the LTE measurement gap to 6 ms (which is larger than the SS period). However, in some standards (e.g., TS 38.133), the measurement gap for NR may be up to 6 ms. Thus, in Scenario 1, without having any timing alignment information regarding the neighbor NR BS, a 6 ms measurement gap may not be sufficient for NR SMTC.

Figure 8:
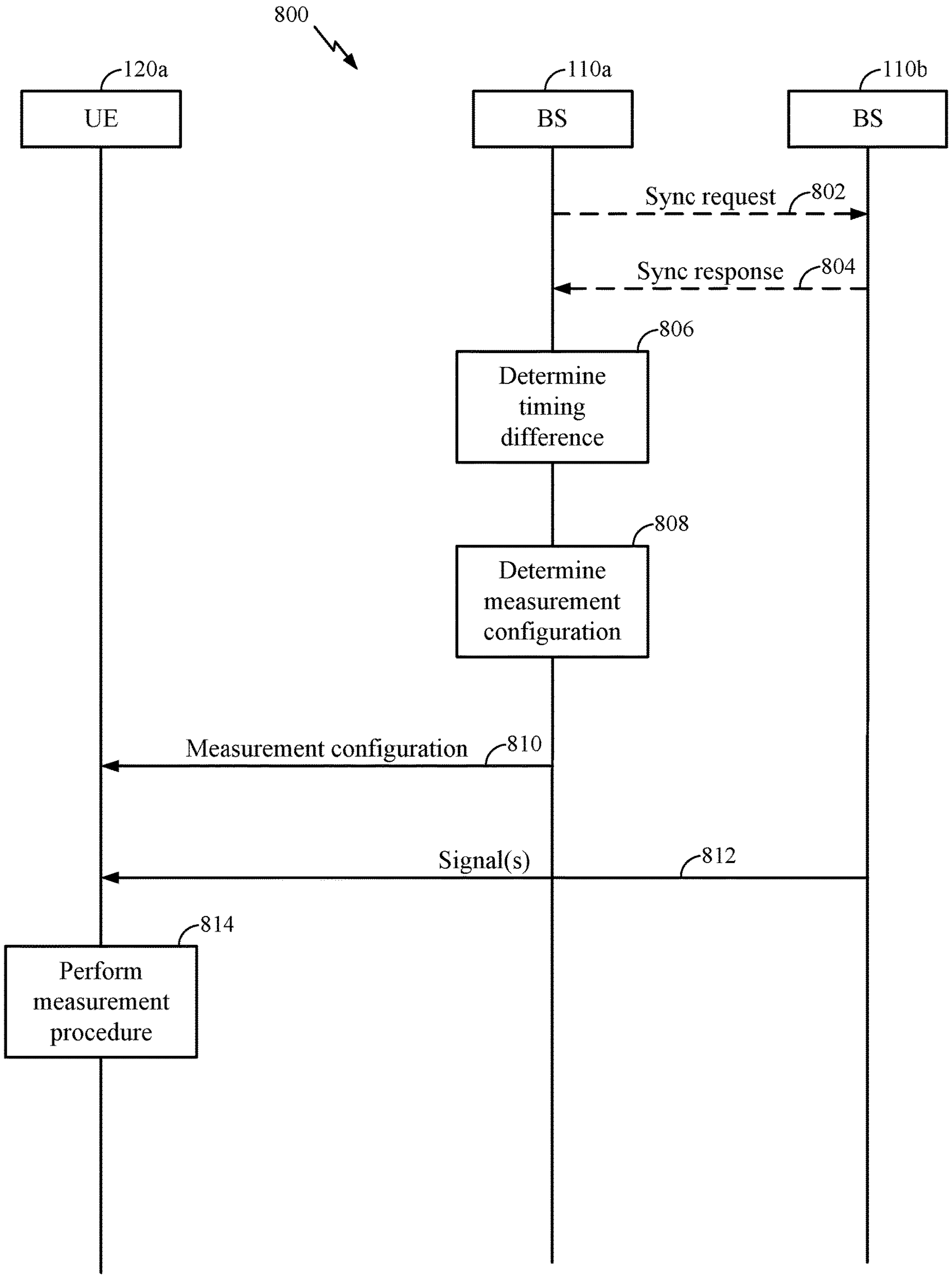
FIG. 8 illustrates an example call flow for achieving multi-cell synchronization, in accordance with certain aspects of the present disclosure.

To address the issue with Scenario 1, aspects provide techniques that enable each FDD LTE BS to acquire the timing difference with a TDD NR BS, and configure a measurement window based on the timing difference. In one aspect, the FDD LTE BS may perform a new procedure on the network interface (e.g., interface 406, such as Xn interface) to obtain the timing difference with the TDD NR BS. As shown in the example call flow 800 in FIG. 8, the procedure may involve sending, by the anchor LTE BS (e.g., BS 110*a*), a synchronization message (e.g., synchronization (sync) request 802) that includes a (first) time stamp to the target NR BS (e.g., BS 110*b*). In response, the NR BS may respond with another synchronization message (e.g., synchronization (sync) response 804) that includes a (second) time stamp. For example, the synchronization message sent in 802 and/or 804 may be a "sequence+payload (time stamp)". The anchor LTE BS may determine (at 806) the timing difference, based on the (first) time stamp in the synchronization request 802 and the (second) time stamp in the synchronization response 804. For example, the timing difference may be set to a difference between the (first) time stamp in the synchronization request 802 and the (second) time stamp in the synchronization response 804.

Note that, in Scenario 1 (e.g., with an anchor FDD LTE BS and TDD NR BSs), the timing difference (determined at 806) between a given FDD LTE BS and each of the TDD NR BSs is the same single value, e.g., since TDD NR BS(s) may be fully synchronized. Further, note that while the above technique is described with reference to a FDD LTE BS (as the anchor) with a TDD NR BS as the neighbor cell, the above technique may also be suitable for a TDD LTE BS (as the anchor) with a TDD NR BS as the neighbor cell.

Other techniques can also be used to obtain the timing difference (at 806) between the anchor LTE BS and the neighbor NR BSs. In one example technique, a common and unique timing reference may be predefined for each BS. This unique timing reference can be based on GPS, IEEE 1588, etc. Another example technique involves the anchor LTE BS listening to the neighbor NR BS's synchronization signals. Yet another example technique involves the UE measuring the gap and reporting to the serving BS.

In one aspect, once the timing difference (at 806) is acquired, the anchor LTE BS may determine a measurement configuration (at 808), based on the timing difference, and send the measurement configuration (at 810) to the UE (e.g., UE 120*a*). In one example, the anchor LTE BS may send the measurement configuration (including an indication of the timing difference) to the UE when asking the UE to perform SMTC. For instance, a new element "timing difference" can be included within the radio resource control (RRC) message "MeasObjectNR." The element "timing difference" may be the timing difference with the serving cell and include at least one of: a system frame number (SFN) offset, a slot level offset, or a symbol level offset. In one reference example, the timing difference can indicate the following:

| | |
|---|---|
| physCellID | PhysCellId |
| sfn-Offset | INTEGER (0..1023) |

-continued

| | |
|---|---|
| Slot-Offset | INTEGER (−79,79) |
| Symbol-Offset | INTEGER (−13,13) |

The UE may perform a measurement procedure (at 814) to measure one or more signals 812 received from the anchor LTE BS, based on the measurement configuration. Note that, in some aspects, the slot and symbol offset may have different time lengths if the subcarrier spacing is different. In some cases, for example, the slot and/or the symbol offset can be based on the target cell's subcarrier spacing. In some cases, the slot and/or the symbol offset can be based on the serving cell's subcarrier spacing. In some cases, the slot and/or the symbol offset can be based on the higher subcarrier spacing among the target and serving cells.

In another example scenario (referred to herein as Scenario 2), a FDD NR BS (anchor) (e.g., BS 110*a*) may be in a DC with another FDD NR BS (e.g., BS 110*b*). Similar to Scenario 1, one issue with Scenario 2 is that the NR anchor BS may not be synchronized with the NR neighbor BS, and therefore, the NR anchor BS may not know the timing difference with the NR neighbor BSs. This can lead to the NR anchor BS configuring a 6 ms measurement gap, which may be insufficient without the timing alignment information.

To address the issue with Scenario 2, aspects may enable each NR BS to acquire the neighboring cells' timing difference (e.g., at 806) and configure a measurement window based on the set of timing differences (e.g., at 808). Compared with Scenario 1, because the neighbor cells are not time aligned, the timing difference in Scenario 2 (at 806) may include a list of timing difference values. Further, compared with Scenario 1, the network interface may be between gNB(s) as opposed to between eNB and gNB. In one aspect, the NR anchor BS can optimize the measurement configuration by determining the measurement configuration (at 808) as the sum of the measurement windows of a subset of the NR neighbor BSs. For example, the NR anchor BS can determine the subset of the NR neighbor BS(s) based on at least one of a UE location or a BS signal strength.

In another example scenario (referred to herein as Scenario 3), a TDD NR BS (anchor) (e.g., BS 110*a*) may be in a DC with a FDD enhanced LTE BS (e.g., BS 110*b*). One issue with Scenario 3 is that while the NR anchor BS may be synchronized with other TDD NR BSs, the NR anchor BS may not know the timing difference with the asynchronized LTE neighbor BSs. However, in this situation, the 6 ms measurement gap may be sufficient for the LTE BS. In some aspects, the NR anchor BS can achieve a further reduction of the measurement gap by maintaining a list of the timing differences with the neighbor cells and configuring the largest one as the measurement window (e.g., at 808). As an NR anchor BS in a synchronized network, this single difference table could be shared with neighboring NR anchor BSs.

Additionally, for Scenario 3, the NR anchor BS can optimize the measurement configuration by determining the measurement configuration (at 808) as the sum of the measurement windows of the selected neighbor BS. The BS selection criteria, for example, may be based on at least one of a UE location or BS signal strength.

Figure 9:
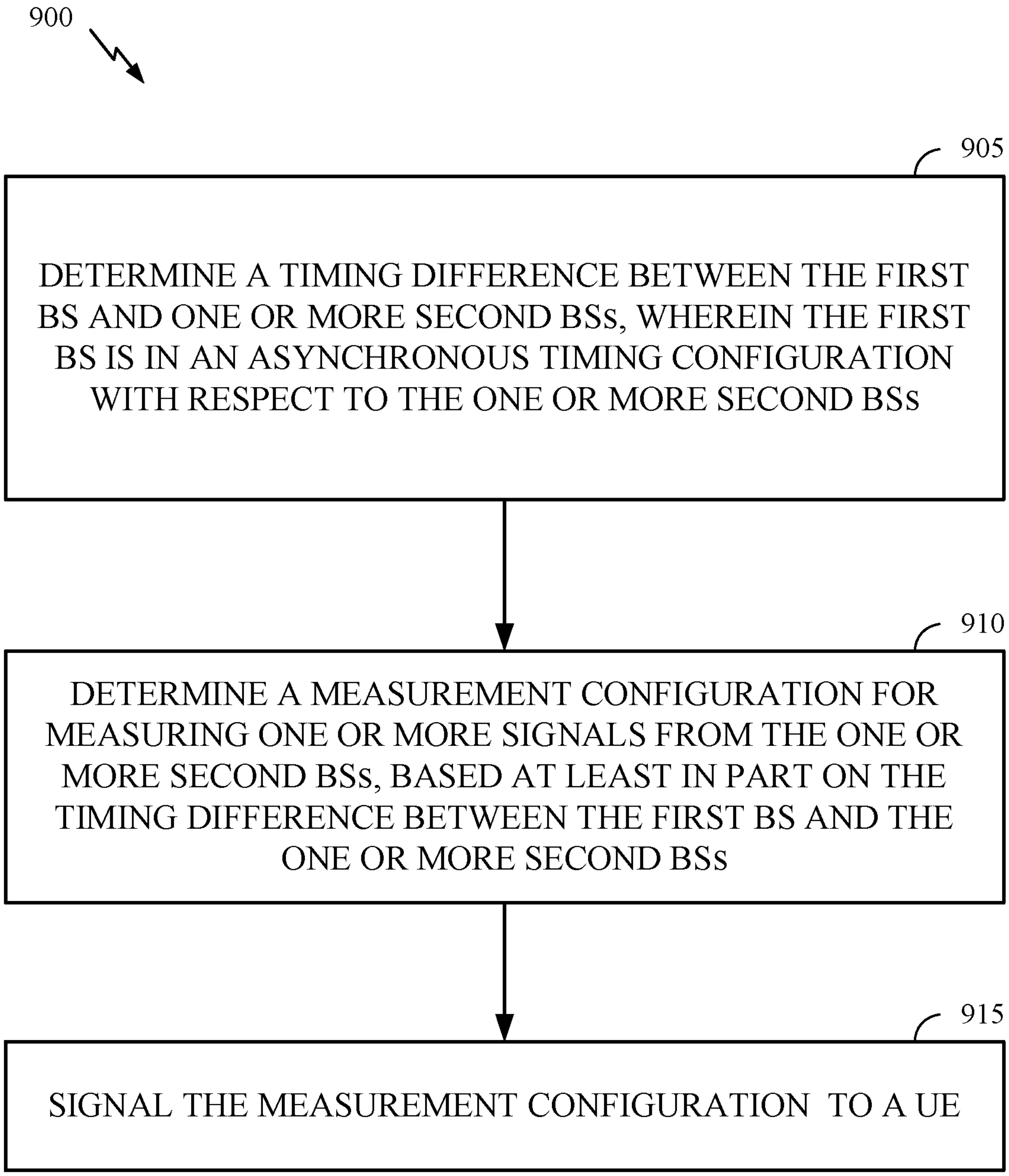
FIG. 9 is a flow diagram illustrating example operations for wireless communication by a serving BS, in accordance with certain aspects of the present disclosure.

FIG. 9 is a flow diagram illustrating example operations 900 for wireless communication, in accordance with certain aspects of the present disclosure. The operations 900 may be performed, for example, by an anchor (or serving) BS (e.g., such as the BS 110*a* in the wireless communication network 100). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at 905, where the first (anchor) BS determines a timing difference between the first BS and one or more second (neighbor) BSs (e.g., BS 110*b*). The first BS is in an asynchronous timing configuration with respect to the one or more second BSs. In some aspects, the first BS may be associated with a first radio access technology (RAT) and a first duplexing mode, and the one or more second BSs may be associated with a second RAT and a second duplexing mode.

In some aspects, the timing difference (at 905) may include at least one of a system frame number offset, a slot offset, or a symbol offset. In some aspects, at least one of the slot offset or the symbol offset may be based on (i) a subcarrier spacing of one of the one or more second BSs or (ii) a subcarrier spacing of the first BS, or (iii) a highest subcarrier spacing between the first BS and the one or more second BSs.

At 910, the first BS determines a measurement configuration for measuring one or more signals from the one or more second BSs, based at least in part on the timing difference between the first BS and the one or more second BSs. At 915, the anchor BS signals the measurement configuration to a UE (e.g., UE 120*a*).

In one aspect, the timing difference (at 905) may be a single timing difference value. In this aspect, the first BS may determine the timing difference by (i) sending a synchronization request (e.g., synchronization request 802) comprising a first time stamp to one of the one or more second BSs via a network interface between the first BS and the second BS; (ii) receiving, from the one second BS via the network interface, a synchronization response (e.g., synchronization response 804) comprising at least a second time stamp; and (iii) setting the single timing difference value to a difference between the first time stamp and the second time stamp. In this aspect, determining the measurement configuration (at 910) may include determining a measurement window for measuring the one or more signals from the one or more second BSs, based on the single timing difference value. Moreover, in this aspect, the first RAT may be LTE and the first duplexing mode may be FDD or TDD, and the second RAT may be NR and the second duplexing mode may be TDD.

In one aspect, the timing difference (at 905) may include a plurality of timing difference values. In this case, the first BS may determine the timing difference by (i) sending a synchronization request (e.g., synchronization request 802) comprising a first time stamp to each of the one or more second BSs via a network interface between the first BS and the second BS; (ii) receiving, from each of the one or more second BS(s) via the network interface, a synchronization response (e.g., synchronization response 804) comprising at least a second time stamp; and (iii) for each second time stamp received from a second BS, setting the timing difference value to a difference between the first time stamp and the second time stamp.

In this aspect, the first BS may determine the measurement configuration (at 910) by determining a measurement window for measuring the one or more signals from the one or more second BSs, based on the plurality of timing difference values. For example, the measurement window may be based on a sum of the plurality of timing difference values. In some cases, the first BS may select the one or more second BSs from a plurality of second BSs neighboring the first BS. The one or more second BSs that are selected may be selected based on at least one of a location of the UE or a signal strength of the second BS.

Here, in some cases, the first RAT may be NR and the first duplexing mode may be FDD, and the second RAT may be NR and the second duplexing mode may be FDD. In another example, the first RAT may be NR and the first duplexing mode may be TDD, and the second RAT may be LTE and the second duplexing mode may be FDD.

Figure 10:
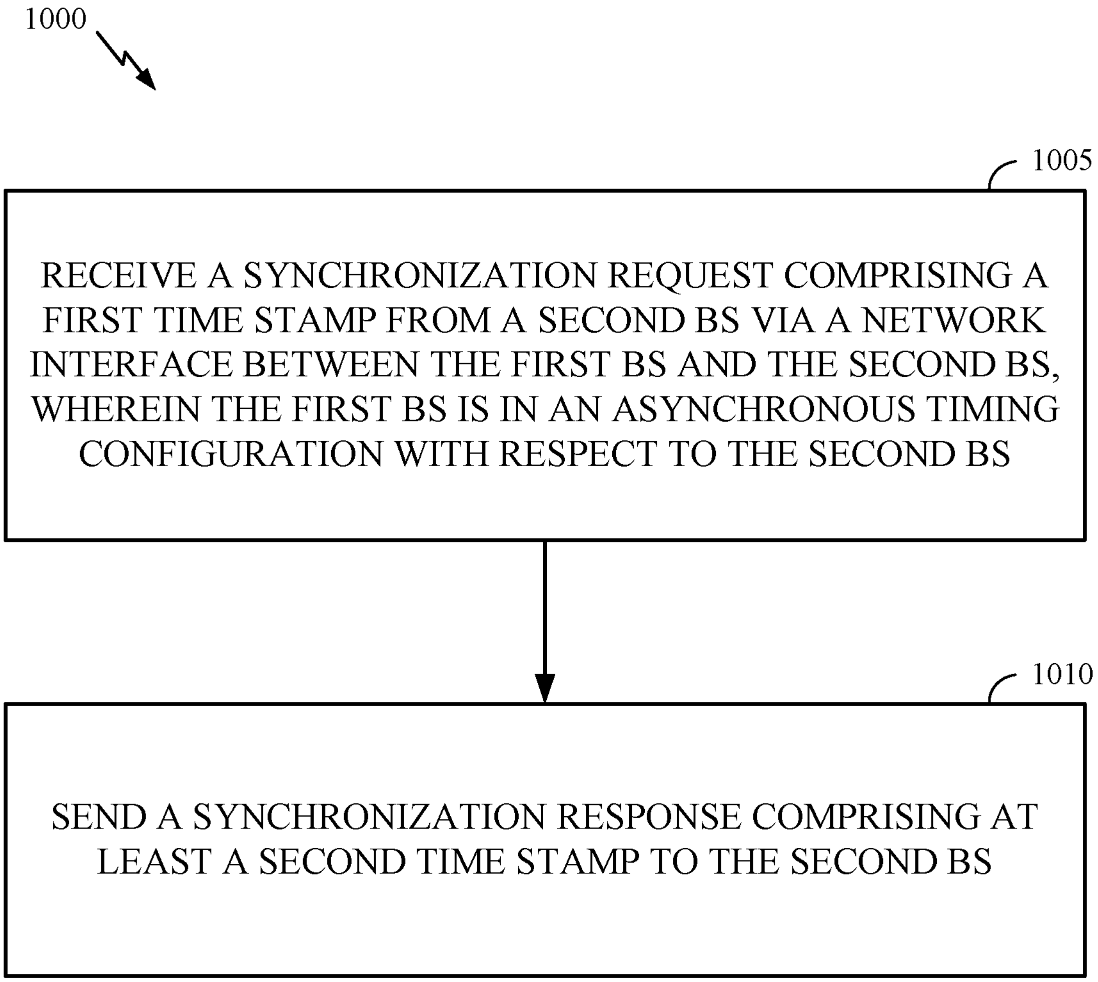
FIG. 10 is a flow diagram illustrating example operations for wireless communication by a neighbor BS, in accordance with certain aspects of the present disclosure.

FIG. 10 is a flow diagram illustrating example operations 1000 for wireless communication, in accordance with certain aspects of the present disclosure. The operations 1000 may be performed, for example, by a neighboring BS (e.g., such as the BS 110*b* in the wireless communication network 100). Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at 1005, where the first (neighboring) BS (e.g., BS 110*b*) receives a synchronization request (e.g., synchronization request 802) comprising a first time stamp from a second (anchor) BS (e.g., BS 110*a*) via a network interface between the first BS and the second BS. The first BS may be in an asynchronous timing configuration with respect to the second BS. At 1010, the first BS sends a synchronization response comprising at least a second time stamp to the second BS.

In some aspects, the first (neighboring) BS may be associated with a first RAT and first duplexing mode, and the second (anchor) BS may be associated with a second RAT and a second duplexing mode. In one case, the first RAT may be NR and the first duplexing mode may be TDD, and the second RAT may be LTE and the second duplexing mode may be FDD. In one case, the first RAT may be NR and the first duplexing mode may be TDD, and the second RAT may be LTE and the second duplexing mode may be TDD. In one case, the first RAT may be NR and the first duplexing mode may be FDD, and the second RAT may be NR and the second duplexing mode may be FDD. In one case, the first RAT may be LTE and the first duplexing mode may be FDD, and the second RAT may be NR and the second duplexing mode may be TDD.

Figure 11:
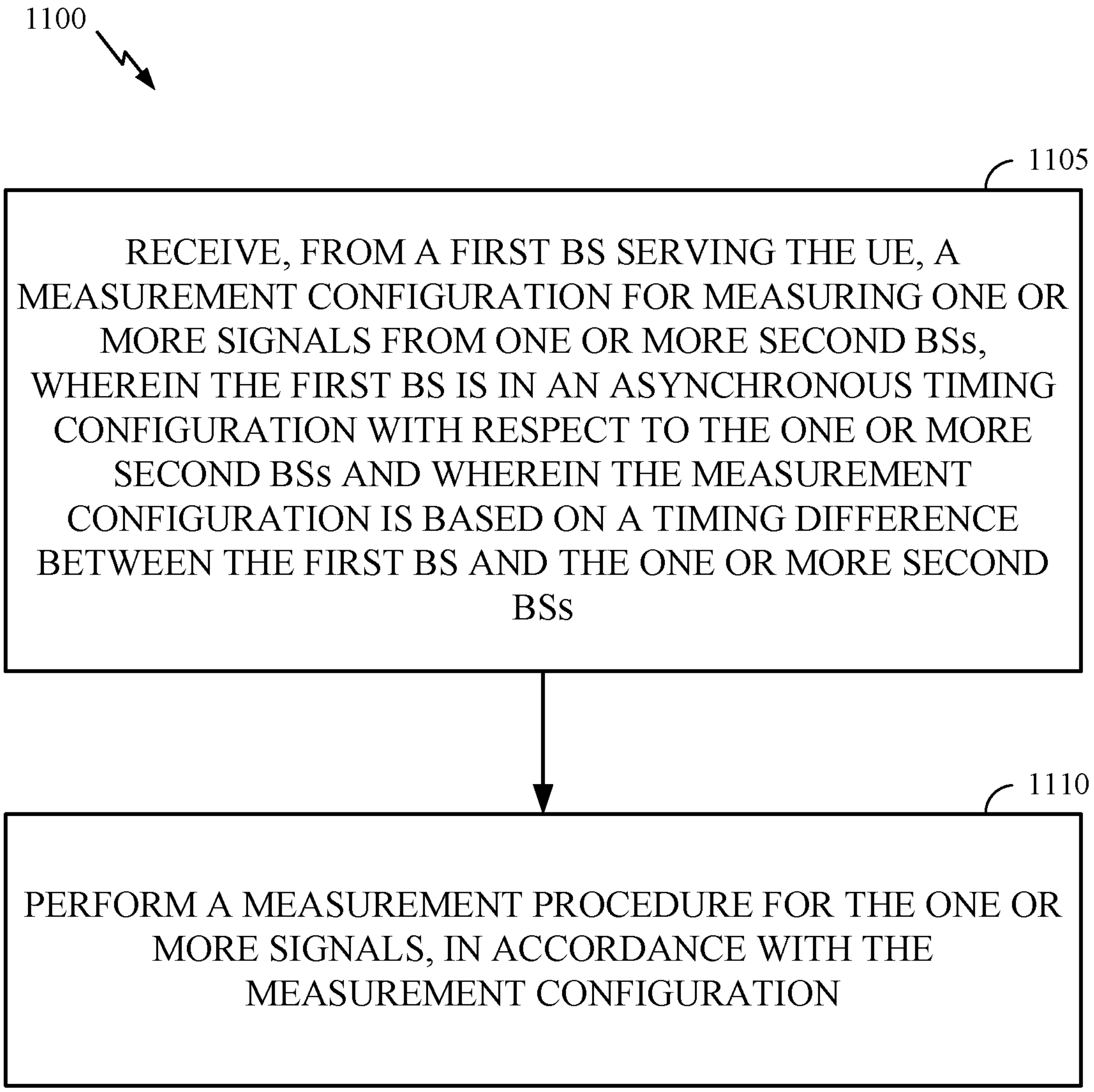
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120*a* in the wireless communication network 100). The operations 1100 may be complimentary operations by the UE to the operations 900 performed by the BS. Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1105, where the UE receives, from an anchor BS (e.g., BS 110*a*) serving the UE, a measurement configuration for measuring one or more signals from one or more second BSs (e.g., BS 110*b*). The first BS may be in an asynchronous timing configuration with respect to the one or more second BSs and the measurement configuration may be based on a timing difference between the anchor BS and the one or more neighboring BSs. At 1110, the UE may perform a measurement procedure for the one or more signals, in accordance with the measurement configuration. The measurement configuration (at 1105) may include an indication of a measurement window for measuring the one or more signals from the one or more second BSs.

In some aspects, the first (anchor) BS may be associated with a first RAT and first duplexing mode, and the second (neighboring) BS may be associated with a second RAT and a second duplexing mode. In one case, the first RAT may be LTE and the first duplexing mode may be FDD, and the second RAT may be NR and the second duplexing mode may be TDD. In one case, the first RAT may be LTE and the first duplexing mode may be TDD, and the second RAT may be NR and the second duplexing mode may be TDD. In one case, the first RAT may be NR and the first duplexing mode may be FDD, and the second RAT may be NR and the second duplexing mode may be FDD. In one case, the first RAT may be NR and the first duplexing mode may be TDD, and the second RAT may be LTE and the second duplexing mode may be FDD. The measurement configuration may be based on at least one of the first RAT, the first duplexing mode, the second RAT, or the second duplexing mode.

In some aspects, the timing difference may include at least one of a system frame number offset, a slot offset, or a symbol offset. In some aspects, at least one of the slot offset or the symbol offset may be based on (i) a subcarrier spacing of one of the one or more second BSs or (ii) a subcarrier spacing of the first BS, or (iii) a highest subcarrier spacing between the first BS and the one or more second BSs.

Figure 12:
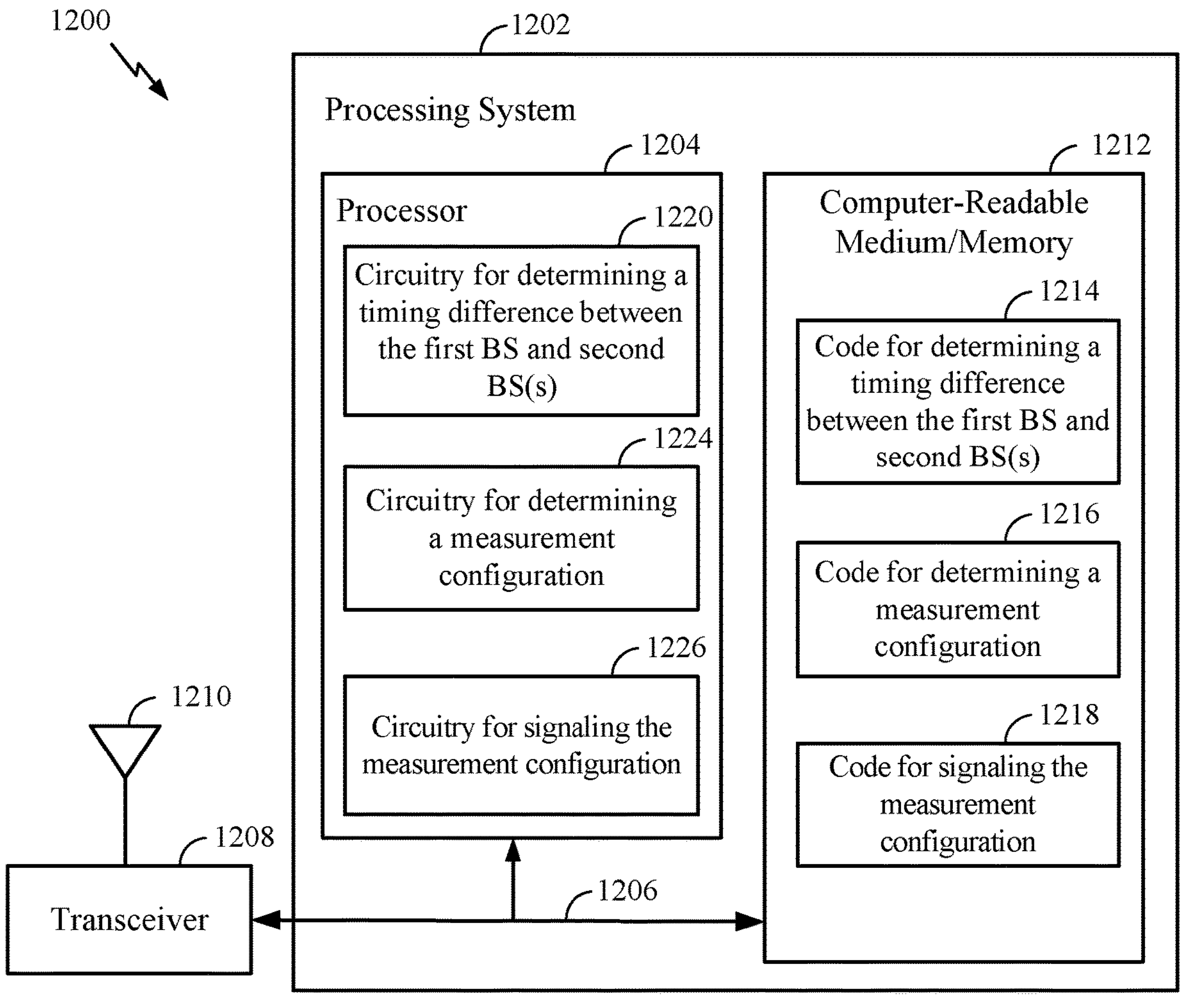
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations 900 illustrated in FIG. 9 or other operations for performing the various techniques discussed herein. In certain aspects, computer-readable medium/memory 1212 stores code 1214 for determining a timing difference between the first (anchor) BS and second (neighboring) BS(s), wherein the first BS is in an asynchronous timing configuration with respect to the one or more second BSs; code 1216 for determining a measurement configuration for measuring one or more signals from the one or more second BSs, based at least in part on the timing difference between the first BS and the one or more second BSs; code 1218 for signaling the measurement configuration to a user equipment (UE) served by the first BS; etc. In certain aspects, the processor 1204 has circuitry configured to implement the code stored in the computer-readable medium/memory 1212. The processor 1204 includes circuitry 1220 for determining a timing difference between the first (anchor) BS and second (neighboring) BS(s), wherein the first BS is in an asynchronous timing configuration with respect to the one or more second BSs; circuitry 1224 for determining a measurement configuration for measuring one or more signals from the one or more second BSs, based at least in part on the timing difference between the first BS and the one or more second BSs; circuitry 1226 for signaling the measurement configuration to a user equipment (UE) served by the first BS, etc.

Figure 13:
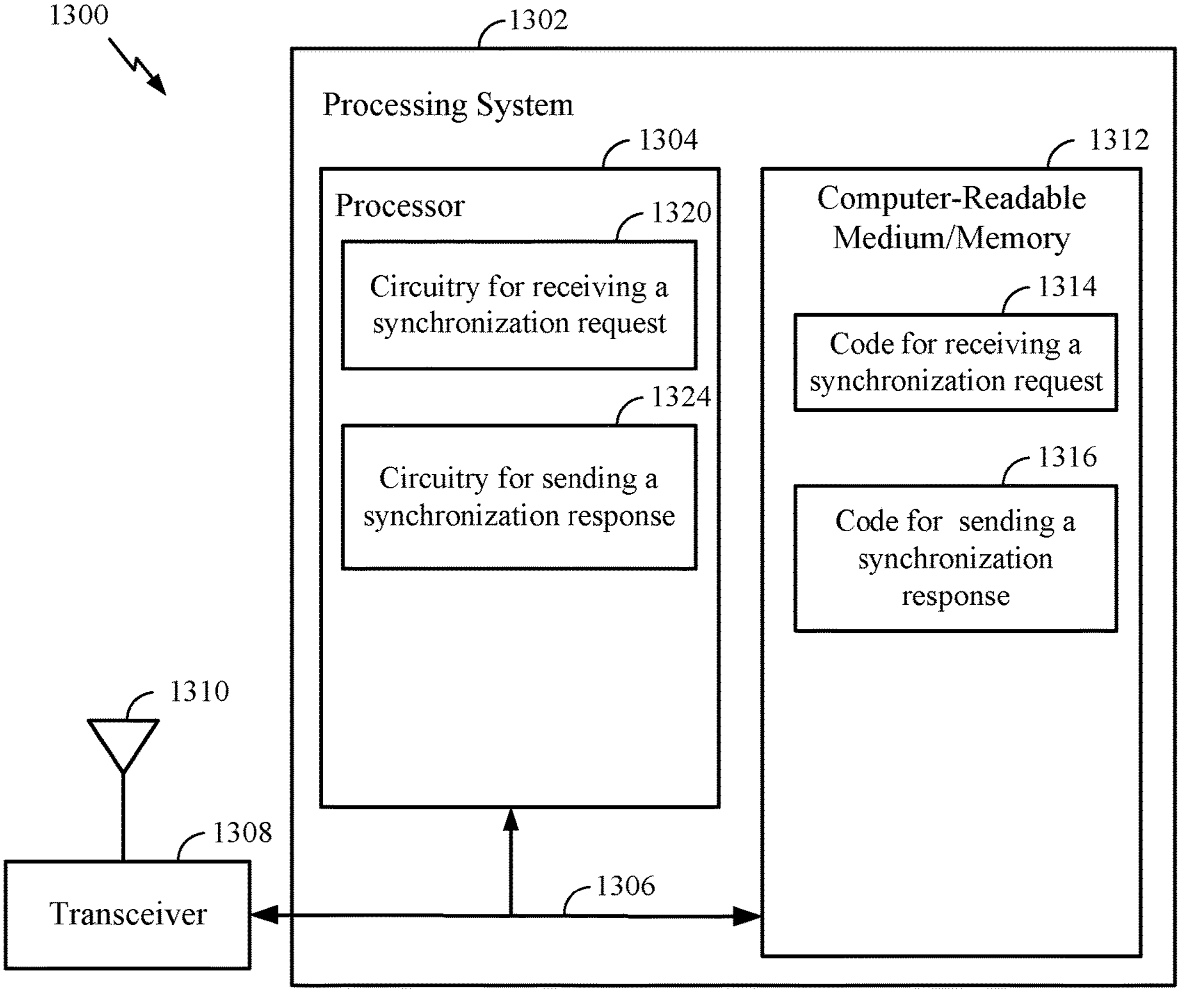
FIG. 13 illustrates another communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations 1000 illustrated in FIG. 10, or other operations for performing the various techniques discussed herein. In certain aspects, computer-readable medium/memory 1312 stores code 1314 for receiving a synchronization request comprising a first time stamp from a second (anchor) BS via a network interface between the first (neighboring) BS and the second BS, wherein the first BS is in an asynchronous timing configuration with respect to the second BS; and code 1316 for sending a synchronization response comprising at least a second time stamp to the second BS. In certain aspects, the processor 1304 has circuitry configured to implement the code stored in the computer-readable medium/memory 1312. The processor 1304 includes circuitry 1320 for receiving a synchronization request comprising a first time stamp from a second BS via a network interface between the first BS and the second BS, wherein the first BS is in an asynchronous timing configuration with respect to the second BS; and circuitry 1324 for sending a synchronization response comprising at least a second time stamp to the second BS.

Figure 14:
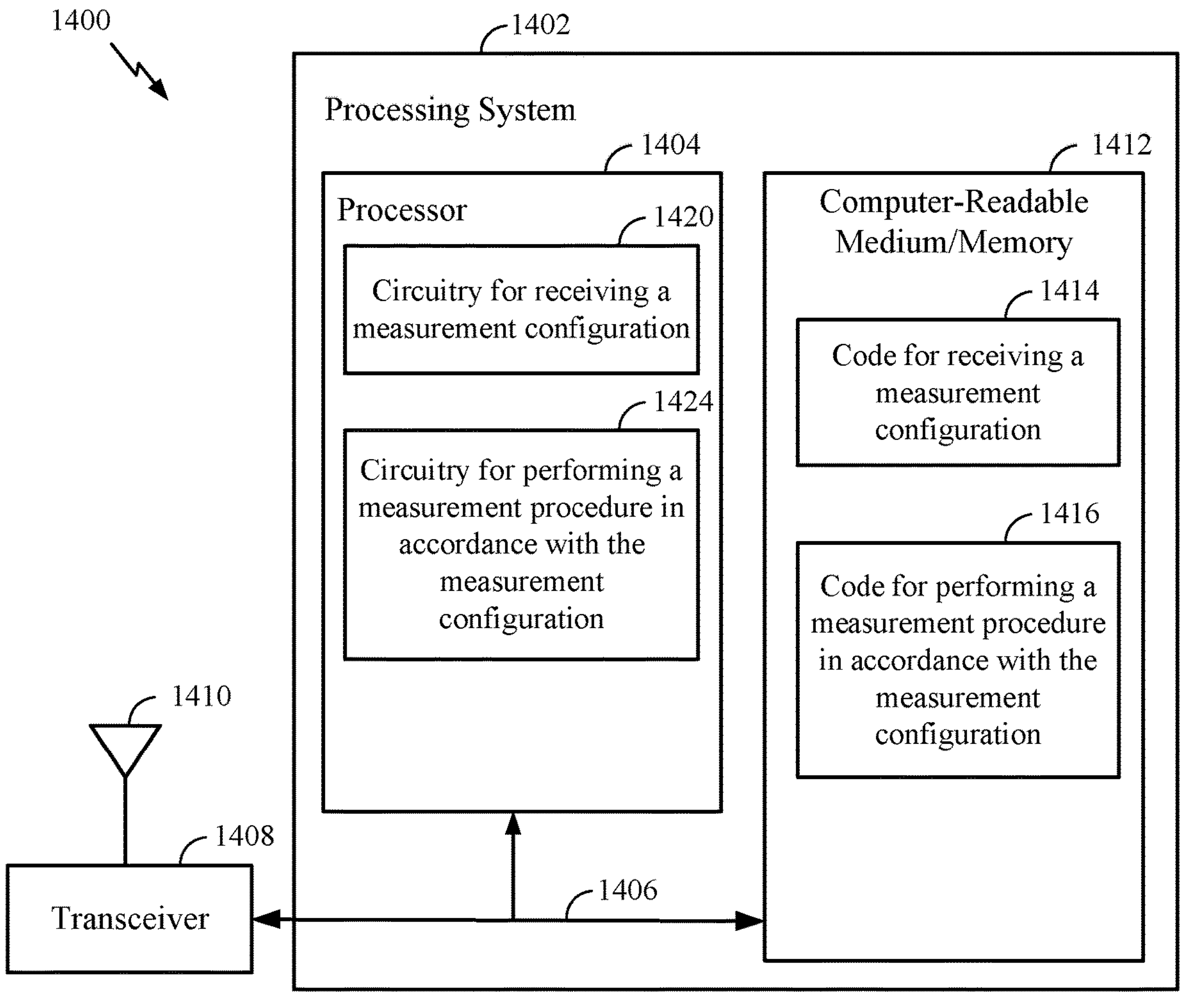
FIG. 14 illustrates yet another communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations 1100 illustrated in FIG. 11, or other operations for performing the various techniques discussed herein. In certain aspects, computer-readable medium/memory 1412 stores code 1414 for receiving, from a first base station (BS) serving the UE, a measurement configuration for measuring one or more signals from one or more second (neighboring) BSs, wherein the first BS is in an asynchronous timing configuration with respect to the one or more second BSs and wherein the measurement configuration is based on a timing difference between the first BS and the one or more second BSs; and code 1416 for performing a measurement procedure for the one or more signals, in accordance with the measurement configuration. In certain aspects, the processor 1404 has circuitry configured to implement the code stored in the computer-readable medium/memory 1412. The processor 1404 includes circuitry 1420 for receiving, from a first base station (BS) serving the UE, a measurement configuration for measuring one or more signals from one or more second (neighboring) BSs, wherein the first BS is in an asynchronous timing configuration with respect to the one or more second BSs and wherein the measurement configuration is based on a timing difference between the first BS and the one or more second BSs; and circuitry 1424 for performing a measurement procedure for the one or more signals, in accordance with the measurement configuration.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A wireless node, comprising:

at least one transceiver configured to receive, from a first base station (BS) serving the wireless node, a measurement configuration that is based on a timing difference between the first BS and one or more second BSs; and a processing system configured to perform a measurement procedure by using one or more signals from the one or more second BSs, in accordance with the measurement configuration.

2. The wireless node of claim 1, wherein the timing difference comprises at least one of a system frame number offset, a slot offset, or a symbol offset.

3. The wireless node of claim 2, wherein at least one of the slot offset or the symbol offset is based on (i) a subcarrier spacing of one of the one or more second BSs or (ii) a subcarrier spacing of the first BS, or (iii) a highest subcarrier spacing between the first BS and the one or more second BSs.

4. The wireless node of claim 1, wherein the measurement configuration comprises an indication of a measurement window associated with measuring the one or more signals from the one or more second BSs.

5. The wireless node of claim 1, wherein:

the first BS is associated with a first radio access technology (RAT) and a first duplexing mode;

the one or more second BSs are associated with a second RAT and a second duplexing mode; and the measurement configuration is based on at least one of the first RAT, the first duplexing mode, the second RAT, or the second duplexing mode.

6. The wireless node of claim 5, wherein:

(i) the first RAT is Long Term Evolution (LTE), the first duplexing mode is frequency division duplexing (FDD), the second RAT is New Radio (NR), and the second duplexing mode is time division duplexing (TDD);

(ii) the first RAT is LTE, the first duplexing mode is TDD, the second RAT is NR, and the second duplexing mode is TDD;

(iii) the first RAT is NR, the first duplexing mode is FDD, the second RAT is NR, and the second duplexing mode is FDD; or (iv) the first RAT is NR, the first duplexing mode is TDD, the second RAT is LTE, and the second duplexing mode is FDD.

7. A method of wireless communication by a user equipment (UE), comprising:

receiving, from a first base station (BS) serving the UE, a measurement configuration that is based on a timing difference between the first BS and one or more second BSs; and performing a measurement procedure by using one or more signals from the one or more second BSs, in accordance with the measurement configuration.

8. The wireless node of claim 1, further comprising at least one antenna coupled to the at least one transceiver, wherein the at least one transceiver is configured to receive the measurement configuration via the at least one antenna, wherein the wireless node is configured as a user equipment (UE).

9. A network node, comprising:

a processing system configured to obtain a timing difference between the network node and one or more base stations (BSs) or at least one transceiver configured to receive the timing difference between the network node and the one or more BSs, wherein:

the network node is in an asynchronous timing configuration with respect to the one or more BSs; and the at least one transceiver is configured to transmit a measurement configuration to a user equipment (UE) served by the network node, the measurement configuration being associated with measuring one or more signals from the one or more BSs and being based on the timing difference between the network node and the one or more BSs.

10. The network node of claim 9, wherein the timing difference comprises at least one of a system frame number offset, a slot offset, or a symbol offset.

11. The network node of claim 10, wherein at least one of the slot offset or the symbol offset is based on (i) a subcarrier spacing of one of the one or more BSs or (ii) a subcarrier spacing of the network node, or (iii) a highest subcarrier spacing between the network node and the one or more BSs.

12. The network node of claim 9, wherein:

the network node is associated with a first radio access technology (RAT) and a first duplexing mode;

the one or more BSs are associated with a second RAT and a second duplexing mode; and the measurement configuration is based on at least one of the first RAT, the first duplexing mode, the second RAT, or the second duplexing mode.

13. The network node of claim 12, wherein:

the timing difference is a single timing difference value;

the at least one transceiver is further configured to:

transmit a synchronization request comprising a first time stamp to one of the one or more BSs via a network interface between the network node and the one BS; and receive, from the one BS via the network interface, a synchronization response comprising at least a second time stamp; and the processing system is further configured to set the single timing difference value to a difference between the first time stamp and the second time stamp.

14. The network node of claim 13, wherein:

the first RAT is Long Term Evolution (LTE) and the first duplexing mode is frequency division duplexing (FDD); and the second RAT is New Radio (NR) and the second duplexing mode is time division duplexing (TDD).

15. The network node of claim 13, wherein:

the first RAT is Long Term Evolution (LTE) and the first duplexing mode is time division duplexing (TDD); and the second RAT is New Radio (NR) and the second duplexing mode is TDD.

16. The network node of claim 13, wherein:

the processing system is further configured to determine a measurement window associated with measuring the one or more signals from the one or more BSs, based on the single timing difference value; and the measurement configuration comprises the measurement window.

17. The network node of claim 12, wherein:

the timing difference comprises a plurality of timing difference values;

the at least one transceiver is further configured to:

transmit a synchronization request comprising a first time stamp to each of the one or more BSs via a network interface between the network node and the BS; and receive, from each of the one or more BSs via the network interface, a synchronization response comprising at least a second time stamp; and the processing system is further configured to, for each second time stamp received from a second BS, set a different one of the plurality of timing difference values to a difference between the first time stamp and the second time stamp.

18. The network node of claim 17, wherein:

the first RAT is New Radio (NR) and the first duplexing mode is frequency division duplexing (FDD); and the second RAT is NR and the second duplexing mode is FDD.

19. The network node of claim 17, wherein:

the first RAT is New Radio (NR) and the first duplexing mode is time division duplexing (TDD); and the second RAT is Long Term Evolution (LTE) and the second duplexing mode is frequency division duplexing (FDD).

20. The network node of claim 17, wherein:

the processing system is further configured to determine a measurement window associated with measuring the one or more signals from the one or more second BSs, based on the plurality of timing difference values; and the measurement configuration comprises the measurement window.

21. The network node of claim 20, wherein the measurement window is based on a sum of the plurality of timing difference values.

22. The network node of claim 20, wherein the processing system is further configured to select the one or more BSs from a plurality of BSs neighboring the network node.

23. The network node of claim 22, wherein the one or more BSs is selected based on at least one of a location of the UE or a signal strength of the BS.

24. A method of wireless communication by a first base station (BS), comprising:

obtaining or receiving a timing difference between the first BS and one or more second BSs, wherein the first BS is in an asynchronous timing configuration with respect to the one or more second BSs; and transmitting, to a user equipment (UE) served by the first BS, a measurement configuration associated with measuring one or more signals from the one or more second BSs, the measurement configuration being based on the timing difference between the first BS and the one or more second BSs.

25. The network node of claim 9, further comprising at least one antenna coupled to the at least one transceiver, wherein the at least one transceiver is configured to receive the timing difference and to transmit the measurement configuration via the at least one antenna, wherein the network node is configured as a base station.

* * * * *